(12) United States Patent
Safavi-Naeini et al.

(10) Patent No.: US 11,029,578 B2
(45) Date of Patent: Jun. 8, 2021

(54) ACOUSTO-OPTIC BEAM STEERING SYSTEM

(71) Applicant: The Board of Trustees of the Leland Stanford Junior University, Stanford, CA (US)

(72) Inventors: Amir-Hossein Safavi-Naeini, Palo Alto, CA (US); Christopher John Sarabalis, Menlo Park, CA (US); Jeremy David Witmer, Palo Alto, CA (US); Patricio Arrangoiz Arriola, San Francisco, CA (US); Raphael Frank Van Laer, Menlo Park, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 0 days.

(21) Appl. No.: 16/621,977

(22) PCT Filed: Jul. 2, 2018

(86) PCT No.: PCT/US2018/040607
§ 371 (c)(1),
(2) Date: Dec. 12, 2019

(87) PCT Pub. No.: WO2019/135787
PCT Pub. Date: Jul. 11, 2019

(65) Prior Publication Data
US 2020/0192184 A1 Jun. 18, 2020

Related U.S. Application Data

(60) Provisional application No. 62/527,332, filed on Jun. 30, 2017.

(51) Int. Cl.
*G02F 1/335* (2006.01)
*G02F 1/295* (2006.01)

(52) U.S. Cl.
CPC ............ *G02F 1/335* (2013.01); *G02F 1/2955* (2013.01)

(58) Field of Classification Search
CPC .............................. G02F 1/335; G02F 1/2955
See application file for complete search history.

(56) References Cited

U.S. PATENT DOCUMENTS

| 4,250,474 | A |   | 2/1981 | Joseph |                |
|-----------|---|---|--------|--------|----------------|
| 4,735,485 | A | * | 4/1988 | Shaw   | ... G02B 6/2821 |
|           |   |   |        |        | 385/4          |

(Continued)

OTHER PUBLICATIONS

Authorized Officer: Shane Thomas, International Search Report and Written Opinion issued in PCT application No. PCT/US2018/040607, dated Jun. 25, 2019, 8 pp.

(Continued)

*Primary Examiner* — John Bedtelyon
(74) *Attorney, Agent, or Firm* — Kaplan Breyer Schwarz, LLP

(57) ABSTRACT

Systems and methods for steering an optical beam in two dimensions are disclosed. The system includes a substrate comprising an acousto-optic antenna array and an acoustic transducer. Each antenna of the antenna array includes a high-confinement surface waveguide carrying a light signal. The acoustic transducer imparts acoustic energy into each surface waveguide as a mechanical wave. Interaction of the light signal and mechanical wave in each surface waveguide induces light to scatter into free space. The light scattered out of the plurality of waveguides collectively defines the output beam. The longitudinal angle of output beam, relative to the substrate, is determined by the relative frequencies of the mechanical waves and the light signals. The transverse angle of the output beam is controlled by controlling the relative phases of the mechanical waves and/or light signals across the surface-waveguide array.

24 Claims, 8 Drawing Sheets

(56) References Cited

U.S. PATENT DOCUMENTS

| | | | |
|---|---|---|---|
| 4,961,632 | A | 10/1990 | Hatori et al. |
| 5,165,104 | A | 11/1992 | Weverka |
| 9,104,086 | B1 | 8/2015 | Davids et al. |
| 2005/0248826 | A1* | 11/2005 | Tsarev .................... G02F 1/125 359/285 |
| 2014/0300695 | A1 | 10/2014 | Smalley et al. |
| 2015/0338718 | A1 | 11/2015 | Zhang et al. |

OTHER PUBLICATIONS

Christopher Sarabalis et al., "Optomechanical antennas for on-chip beam-steering", Oct. 12, 2017, 15 pp.

Enbang Li et al., "Optical phase shifting with acousto-optic devices", "Optics Letters", Jan. 15, 2005, Publisher: The Optical Society, pp. 189-191, vol. 30, No. 2.

Krishna C. Balram et al., "Acousto-optic and opto-acoustic modulation in piezo-optomechanical circuits", Sep. 30, 2016, 8 pp.

Christopher Poulton et al., Large-scale silicon nitride nanophotonic phased arrays at infrared and visible wavelengths, Dec. 20, 2016, p. 21, vol. 42/ No. 1.

Jörn P. Epping et al., Ultra-low-power stress-optics modulator for microwave photonics, Feb. 16, 2017, vol. 10106.

Partial European Search Report issued in EP Patent Application No. 18898631.9 dated Feb. 5, 2021.

* cited by examiner view through line a-a view through line b-b in FIG. 3A

ACOUSTO-OPTIC BEAM STEERING SYSTEM

RELATED APPLICATIONS

This application claims the benefit of U.S. Provisional Application No. 62/527,332 filed Jun. 30, 2017. The entire disclosure of U.S. Provisional Application No. 62/527,332 is incorporated herein by reference.

STATEMENT REGARDING FEDERALLY SPONSORED RESEARCH

This invention was made with Government support under contract 1509107 awarded by the National Science Foundation and under contract N00014-15-1-2761 awarded by the Office of Naval Research. The Government has certain rights in the invention.

TECHNICAL FIELD

The present disclosure relates to optical beam steering in general, and, more particularly, to optical-phased-array-based beam steering.

BACKGROUND

Two-dimensional optical beam steering is an important technology that has found widespread use in a variety of applications, including telecommunications, LiDAR, three-dimensional imaging, hyperspectral imaging, and optical sensing applications, among others.

Historically, most beam-steering systems employed slow and expensive macro-mechanical-beam-deflection systems such as two-dimensional gimbal-based movable mirrors, pairs of one-dimensional movable mirrors, position-controllable bulk optics, and the like. Unfortunately, such systems are typically complex to implement, are quite costly, have limited response speeds, and are fraught with reliability issues.

In contrast, on-chip optical phased arrays (OPAs) offer a substantially solid-state approach to optical beam steering that promise faster, more robust, and less expensive beam-steering systems. Prior-art OPAs have been demonstrated using widely disparate technologies, such as liquid-crystal phase shifters, MEMS-based piston or grating-based mirrors, and integrated-optics-based surface waveguide arrays having integrated grating couplers and thermo-optic phase shifters. Unfortunately, while such prior-art systems offer lower cost and higher reliability than macro-mechanical beam-deflection systems, they still have significant drawbacks.

Liquid-crystal-based phase shifters, for example, are known to have relatively slow response times and are highly sensitive to changes in temperature and wavelength.

Micromechanical (i.e., MEMS-based) OPAs employing piston-actuated mirrors can achieve fast response times; however, it can be difficult to realize a MEMS-based OPA having small inter-element pitch, which limits the size of the field-of-view (FOV) that can be achieved.

OPAs based on integrated-optics-based surface waveguide gratings and tunable lasers also show promise. In such systems, rapidly tuned lasers are used to change the direction of the light by exploiting the high dispersion of the surface waveguide gratings. Unfortunately, this requires implementing rapidly tunable lasers in silicon photonics, gives rise to cross-talk between transmit and receive on the same antenna, and limits the RF bandwidth that can be transmitted on the light field due to angular dispersion.

Furthermore, the geometric perturbations that define the surface waveguide gratings suitable for OPA use are preferably defined using standard lithography techniques to define of the gratings. To realize an output light beam with low beam divergence, however, long waveguides (several millimeters or more) and high-resolution patterning (on the order of one nanometer) can be required. Unfortunately, patterning nanometer-scale features over large areas can be difficult, if not impossible, using standard patterning techniques. As a result, high-cost patterning methods, such as e-beam lithography, x-ray lithography, and the like, are required. Alternatively, the surface waveguides and the gratings therein must be enlarged to increase the required lithography dimensions, thereby reducing waveguide packing density.

Fixed-frequency lasers have been employed to mitigate these disadvantages; however, this leads to other factors arise that can make on-chip two-dimensional (2D) beam steering extremely challenging. For example, the number of phase shifters and couplers required scales unfavorably with the area of the aperture. In addition, the most common phase shifter is a thermo-optic phase shifter, which has poor power efficiency. As a result, milliwatts of static power consumption is typically required per element. For a millimeter-scale aperture, therefore, 2D beam steering consumes kilowatts of power just for powering the phase shifters themselves.

Still further, unlike phased arrays at microwave frequencies where microstrip patch antennas can radiate efficiently and have footprints smaller than the free space wavelength of the electromagnetic field, in the optical domain, it is difficult to fully scatter light from an optical guided wave to a radiating mode with a small footprint (sub-free space-wavelength). As a result, the radiating elements or antennae in a photonic system are typically large and spaced in two dimensions with a pitch greater than the wavelength of the light. The large spacing leads to significant side-lobes and a reduction in phased array performance.

The need for a device technology that enables practical optical beam steering in two dimensions remains, as yet, unmet in the prior art.

SUMMARY

The present disclosure enables optical beam steering by employing dynamic grating structures in each of an array of surface waveguides. The dynamic gratings are formed by imparting mechanical waves having a desired frequency in the surface waveguides. As a result, in each surface waveguide, the optical wave propagating through it is subject to an acousto-optical interaction that causes the optical wave to scatter out of the surface waveguide as free-space optical radiation. The light scattered from the array of surface waveguides collectively defines one or more optical beams that can be independently steered in a first dimension (the longitudinal dimension) by controlling the wavelength of the mechanical waves. Steering in a second dimension (the transverse dimension) is performed by controlling the relative phases of the mechanical and optical waves in each surface waveguide. Furthermore, by employing materials compatible with standard silicon photonics processes, embodiments in accordance with the present disclosure are compatible with previously developed technologies in silicon photonics (e.g., lasers, phase-shifters, detectors, etc.) and enable monolithic integration of electronic circuitry, thereby affording system-scale integration. Embodiments in accordance with the present disclosure are particularly well suited for use in applications such as light detection and ranging (LIDAR), autonomous vehicles, robotics, light-field imaging, plenoptic cameras, free-space optical communications and switching systems, wireless power transfer, medical diagnostics, and the like.

In contrast to the prior art, embodiments in accordance with the present disclosure employ one or more high-confinement waveguides, which affords significant advantages over prior-art acousto-optic systems including: 1) more efficient light scattering; and 2) higher waveguide packing density, which enables better suppression of undesirable sidelobes in the output signals of the beam steering systems.

An illustrative embodiment is an optical beam-steering system comprising an array of high-confinement waveguides, each of which is operatively coupled with a mechanical transducer that imparts a mechanical wave in the material of the surface waveguide. The mechanical transducer is coupled with each surface waveguide through a mechanical phase shifter that enables control over the phase of the mechanical wave in its respective surface waveguide. Two-dimensional beam steering is enabled by controlling the wavelength of the mechanical waves in the surface waveguides, as well as the relative phase of the mechanical waves across the surface waveguide array.

In some embodiments, a high-index-contrast slab waveguide is used instead of an array of individually defined waveguides. Optical and/or mechanical phase shifters control the direction of light and/or mechanical waves in the slab thereby directing outgoing radiation.

In some embodiments, the surface waveguides are held above the substrate by narrow support structures such that most of the structural material of the surface waveguides is movable relative to the substrate.

In some embodiments, each surface waveguide includes a phase shifter that controls the phase of its respective light signal. In such embodiments, the inclusion of mechanical phase shifters is optional.

In some embodiments, at least one of the surface waveguides is optically coupled with a photonic lightwave circuit that includes one or more photonic elements such as lasers, phase shifters, detectors, gain elements, modulators, diffraction elements, Bragg mirrors, splitters, combiners, and the like. In some embodiments, the surface waveguide array is part of a photonic integrated circuit that also includes electronic circuitry, logic elements, and the like.

An embodiment in accordance with the present disclosure is an optical beam steering system comprising: a substrate; a plurality of surface waveguides disposed on the substrate, each surface waveguide conveying a light signal, and each surface waveguide being a high-confinement waveguide; an acoustic transducer that is operatively coupled with the plurality of surface waveguides, the acoustic transducer being configured to induce a plurality of mechanical waves such that each mechanical wave of the plurality thereof is coupled with a different surface waveguide of the plurality thereof; and a phase controller for controlling the relative phase of each mechanical wave of the plurality thereof and the light signal conveyed by its respective surface waveguide.

Another embodiment in accordance with the present disclosure is a method for steering an optical beam, the method comprising: conveying a plurality of light signals having wavelength λ in a plurality of surface waveguides disposed on a substrate, each surface waveguide conveying a different light signal of the plurality thereof, and each surface waveguide being a high-confinement waveguide; coupling a plurality of mechanical waves into the plurality of surface waveguides such that interaction between the plurality of mechanical waves and the plurality of light signals gives rise to emission of an optical beam from the plurality of surface waveguides, wherein the mechanical waves are characterized by first frequency, ω; and controlling the first frequency, ω.

DETAILED DESCRIPTION

Figure 1:
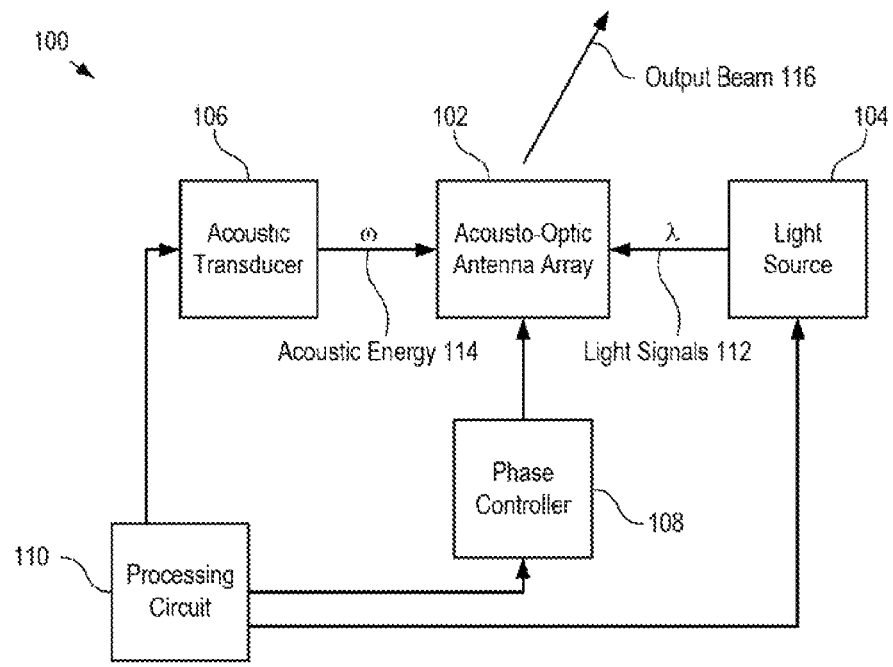
FIG. 1 depicts a functional block diagram of a beam-steering system in accordance with an illustrative embodiment in accordance with the present disclosure.

FIG. 1 depicts a functional block diagram of a beam-steering system in accordance with an illustrative embodiment in accordance with the present disclosure. System 100 comprises acousto-optic antenna array 102, light source 104, acoustic source 106, phase controller 108, and processing circuit 110. System 100 is operative for forming and steering output beam 116 in two dimensions.

Acousto-optic antenna array 102 is a planar lightwave circuit (PLC) comprising a plurality of high-index-contrast, high-confinement surface waveguides formed on a substrate, where each surface waveguide functions as a different antenna element of the antenna array, and where the PLC is configured to efficiently couple mechanical energy provided by acoustic source 106 into the surface waveguides.

As will be understood by one skilled in the art, an integrated-optics-based optical waveguide (referred to herein as a "surface waveguide" or "waveguide") is a light-guiding structure formed on the surface of a substrate. The light-guiding structure comprises a light-guiding core that is surrounded by cladding layers that serve to confine optical energy within the surface waveguide. The materials of the core and cladding are selected such that the refractive index of the core material is at least slightly higher than the refractive index of the cladding material(s). The difference in these refractive indices dictates how tightly the optical energy of a light signal propagating through the surface waveguide is confined to the core region.

Typically, prior-art acousto-optic beam-steering systems are based on surface waveguides whose core and cladding materials have only a slight difference in refractive index resulting in low-confinement of the light. Typically, prior-art acousto-optic beam-steering systems are based on surface waveguides that are not released from their substrate resulting in low-confinement of the mechanical waves. These surface waveguides are referred to, herein, as "low-confinement surface waveguides." In contrast, embodiments in accordance with the present disclosure employ high-confinement waveguides, which affords them significant advantages over the prior art, as discussed below. For the purposes of this Specification, including the appended claims, a "high-confinement waveguide" is defined as an integrated-optics-based optical waveguide whose light-guiding core comprises a material having a refractive index that is at least 10% higher than the refractive index of the cladding material that surrounds the core and is released from its substrate rendering it "mechanically active." As a result, the optical or mechanical energy of a light or acoustic signal propagating through a high-confinement waveguide has a mode field that extends only slightly (if at all) into the cladding regions of the surface waveguide. In the depicted example, the high-confinement waveguides employed in system 100 are air-cladded, silicon-core surface waveguides has a core comprising silicon, which is surrounded by air, where the air functions as the cladding material of the surface waveguide. Silicon has a refractive index of approximately 3.5, while air has a refractive index of 1. Other examples of high-confinement waveguides suitable for use in embodiments in accordance with the present disclosure include, without limitation, surface waveguides having cores of silicon nitride and claddings of air and silicon dioxide, silicon-core surface waveguides having at least one silicon dioxide-based cladding layer, certain silicon oxynitride-core waveguides, and the like.

Light source 104 is a laser that provides light signals 112, each of which has a wavelength, λ1, of approximately 1.55 microns and is optically coupled into the surface waveguides of acousto-optic antenna array 102. In some embodiments, light source 104 is a different source of coherent light. In some embodiments, light signals have a wavelength other than 1.55 microns.

Acoustic source 106 is a generator that is operative for generating acoustic energy 114 that couples into each antenna (i.e., high-confinement waveguide) of acousto-optic antenna array 102 in the form of a mechanical wave having frequency, ω.

Phase controller 108 is a controller operative for controlling the phases of each of the mechanical waves in the surface waveguides of acousto-optic antenna array 102. In some embodiments, phase controller 108 includes a plurality of thermal tuning elements operative for controlling the elasticity and/or density of material between acoustic source 106 and each surface waveguide. In some embodiments, phase controller includes a plurality of elements that controls the phase of the mechanical waves in each surface waveguide via another physical mechanism. In some embodiments, phase controller 108 includes an array of optical phase controllers that control the optical phase of each of the light signals propagating through the surface waveguides of acousto-optic antenna array 102.

Processing circuit 110 is an electronics circuit that includes a conventional processor operative for, among other things, controlling the output of light source 104, acoustic source 106, and phase controller 108 to steer output beam 116 in two dimensions. In the depicted example, processing circuit 110 is monolithically integrated on the same substrate as acousto-optic antenna array 102. In the depicted example, the processing circuit is depicted as a single, discrete component. In various other embodiments, the processing circuit can be distributed, at least in part, among multiple components of system 100, implemented, in part or in full, in a remote or cloud-based computing system, or otherwise implemented in a suitable arrangement for carrying out the functions described herein.

Operating Principle of the Optomechanical Antenna

The operative principle of embodiments in accordance with the present disclosure arises from the fact that an acoustic wave coupled into a surface waveguide can efficiently scatter light propagating as a guided optical wave in the waveguide into a beam that propagates in free space. This is because phase-matching between two optical waves propagating in the longitudinal direction can be achieved using the acoustic wave momentum, while out-of-plane momentum does not need to be conserved for optical waves at a surface that breaks translational symmetry in the vertical direction. As discussed below, the longitudinal angle at which the output beam propagates depends on the relative wavelengths of the acoustic wave and guided optical wave.

Figure 2A:
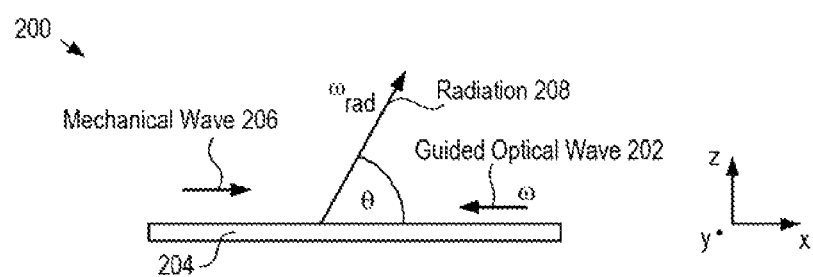
FIG. 2A demonstrates the generation of free-space radiation via interaction between a light signal propagating in a single surface waveguide and a mechanical wave.

FIG. 2A demonstrates the generation of free-space radiation via interaction between a light signal propagating in a single surface waveguide and a mechanical wave. Plot 200 shows guided optical wave 202 as injected into surface waveguide 204 such that it is characterized by frequency, ω, within the surface waveguide.

Mechanical wave 206 is induced in surface waveguide 204 such that the mechanical wave and guided optical wave 202 interact over an interaction length, which gives rise to scattering of the guided optical energy into free space. The mechanical wave induces changes in the optical properties of the surface waveguide materials by, for example, increasing the path length, inducing an index change due to a volume elasto-optic effect, and/or realizing a boundary perturbation effect.

Because energy and momentum conservation requirements must be obeyed, interaction between the mechanical wave and guided optical wave give rise to free-space radiation 208, which is Doppler shifted such that it is characterized by frequency $\omega_{rad}$, where $\omega_{rad}=\omega+\Omega$ and $\Omega$ is the frequency of mechanical wave 206.

In the ideal case, waveguide momentum conservation yields the phase matching condition:

$$\beta(\omega)-K(\Omega)=k_0(\omega_{rad})\cos(\theta), \qquad (1)$$

where $\beta(\Omega)$ is the wavevector of guided optical wave 202, $K(\Omega)$ is the wavevector of mechanical wave 206, θ is the coupling angle (i.e., angle in the x-z plane relative to the surface of the waveguide) at which the output radiation propagates, and $k_0=\omega_{rad}/c$ (where c is the speed of light).

Therefore, by controlling the phase relationship between mechanical wave 206 and guided optical wave 202, the magnitude of coupling angle θ can be controlled.

Figure 2B:
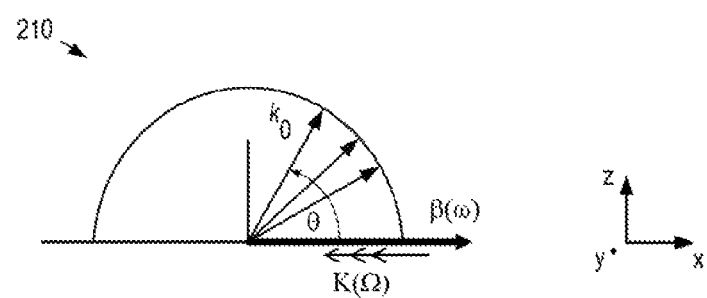
FIG. 2B depicts the relationship between phase-matching between the guided optical and mechanical waves and the coupling angle, θ.

FIG. 2B depicts the relationship between phase-matching between the guided optical and mechanical waves and the coupling angle, θ. Plot 210 depicts coupling angle, θ, for three different phase-matching conditions in the system shown in plot 200.

It should be noted that the induced index changes due to the volume elasto-optic effect, as well as the boundary perturbation effect are significantly enhanced in embodiments in accordance with the present disclosure due to the fact that the surface waveguides included in acousto-optic antenna array 102 are high-confinement waveguides rather than low-confinement waveguides as used in prior-art systems. As a result, embodiments in accordance with the present disclosure require lower amplitude mechanical motion to effect a desired amount of light scatter out of the surface waveguides.

Figure 3A:
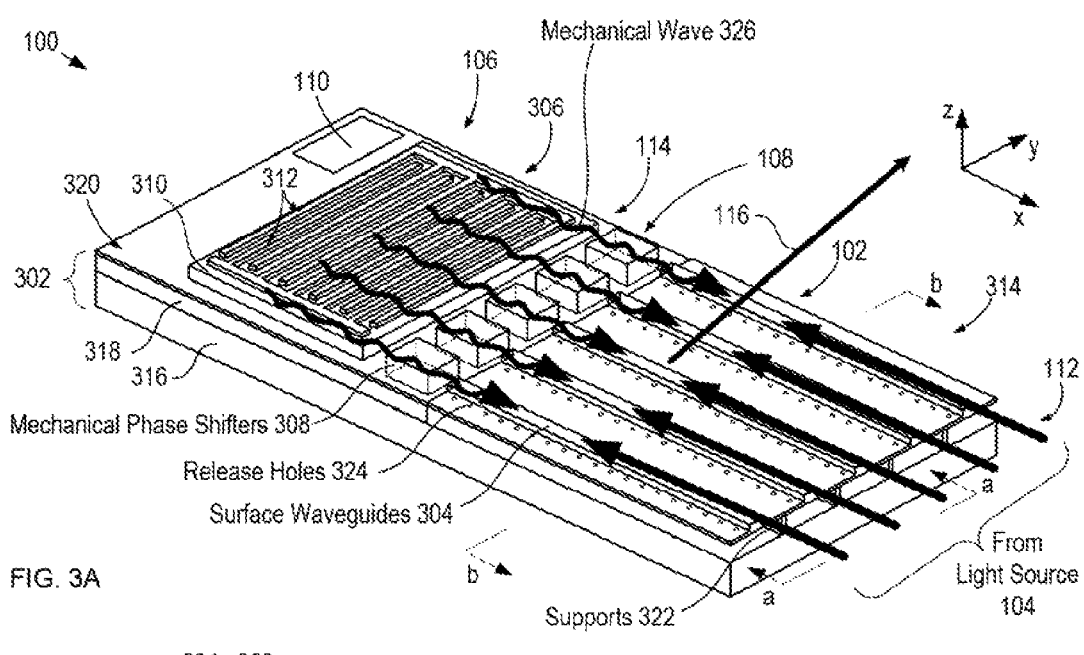
FIG. 3A depicts a schematic diagram of a detailed perspective view of system 100.

Returning now to the illustrative embodiment, FIG. 3A depicts a schematic diagram of a detailed perspective view of system 100. As shown in FIG. 3A, system 100 is an example of a beam-steering system in which acousto-optic antenna array 102, acoustic source 106, and phase controller 108 are monolithically integrated on substrate 302. In the depicted example, system 100 also includes monolithically integrated processing circuit 110. In some embodiments, at least one of acousto-optic antenna array 102, acoustic source 106, phase controller 108, and processing circuit 110 is formed on a separate substrate and integrated in a hybrid manner (or otherwise operatively coupled) with the remaining elements of system 100. In some embodiments, light source 104 is monolithically integrated on substrate 302.

Figure 3B:
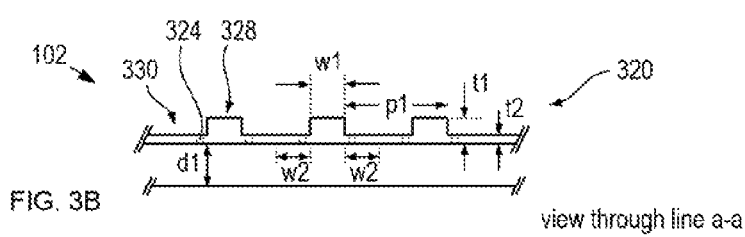
FIG. 3B depicts a schematic drawing of a cross-sectional view of a portion of acousto-optic antenna array 102.
Figure 4:
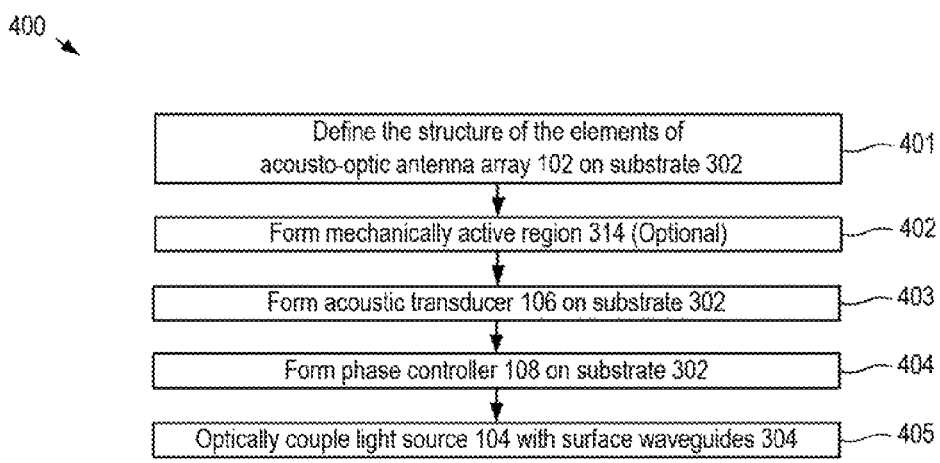
FIG. 4 depicts operations of a method for forming a beam-steering system in accordance with the illustrative embodiment.

FIG. 4 depicts operations of a method for forming a beam-steering system in accordance with the illustrative embodiment. Method 400 begins with operation 401, wherein the structure of the surface waveguide elements of acousto-optic antenna array 102 is defined on substrate 302. Method 400 is described with continuing reference to FIGS. 1 and 3A-B.

Substrate 302 is a conventional substrate suitable for use in a planar processing fabrication method. In the depicted example, substrate 302 is a conventional silicon-on-insulator (SOI) substrate comprising conventional silicon handle wafer 316, buried oxide layer (BOX) 318, and single-crystal-silicon active layer 320, where the thickness of active layer 320 is approximately 300 nanometers (nm).

It should be noted that, while substrate 302 is an SOI substrate in the depicted example, myriad alternative substrates can be used for substrate 302 without departing from the scope of the present disclosure. Substrates suitable for use in embodiments in accordance with the present disclosure include, without limitation, substrates comprising silicon, lithium niobate, compound semiconductors (e.g., gallium arsenide, aluminum gallium arsenide, indium phosphide, cadmium telluride, etc.), semiconductor compounds (e.g., silicon carbide, silicon germanium, etc.), dielectrics, dielectric stacks, glasses, composite materials, and the like.

Acousto-optic antenna array 102 includes a linear array of surface waveguides 304. Each of surface waveguides 304 includes at least a portion that is a straight waveguide, and these straight-waveguide portions are arranged in parallel along the y-direction. For exemplary purposes, acousto-optic antenna array 102 is depicted in FIG. 3 as having only five antenna elements (i.e., surface waveguides 304). It should be noted that, typically, the number of antennae included in acousto-optic antenna array 102 is within the range of 10 to 10,000; however, acousto-optic antenna arrays in accordance with the present disclosure can include any practical number of antennae.

FIG. 3B depicts a schematic drawing of a cross-sectional view of a portion of acousto-optic antenna array 102. The view depicted in FIG. 3B is taken through line a-a as shown in FIG. 3A. Each of surface waveguides 304 is an air-cladded, silicon-core ridge-type surface waveguide that is held above handle wafer 316 by distance d1 within mechanically active region 314.

The structure of surface waveguides 304 is formed in mechanically active region 314 by defining the lateral extent of the ridge portion of each waveguide structure in a photoresist mask disposed on active layer 320 and partially etching the exposed regions of the active layer in a conventional reactive-ion etch (RIE).

In the depicted example, each of surface waveguides 304 is a ridge-type waveguide comprising ridge portion 328 and slab region 330. Ridge portion 328 has width w1 and thickness t1 and slab region 330 has width w2 and thickness t2. The ridge portions project from a substantially continuous slab region with uniform pitch, p1 along the y-direction. In the depicted example, w1 and w2 are 500 nm, t1 is 300 nm, t2 is approximately 100 nm, and waveguide pitch, p1 is 1500 nm. Typically, surface waveguides 304 are configured to guide the optical waves of light signals 112 as well as the mechanical waves of acoustic energy 114.

It should be noted that the dimensions provided above are merely exemplary and that a wide range of waveguide dimensions can be used without departing from the scope of the present disclosure. Furthermore, surface waveguides 304 can have any practical waveguide structure, such as a channel waveguide structure, etc., and/or include any practical core and cladding materials (e.g., silicon nitride, silicon-rich silicon nitride, silicon dioxide, lithium niobate, compound semiconductors, etc.) Furthermore, as discussed below, in some embodiments, the surface-waveguide array of acousto-optic antenna array 102 is replaced by a slab waveguide.

Preferably, surface waveguides 304 are formed in a "mechanically active" region of substrate 302. As a result, at optional operation 402, mechanically active region 314 is formed. In some embodiments, surface waveguides 304 are not disposed on a mechanically active layer.

Mechanically active region 314 is formed by removing BOX layer 318 from underneath it, thereby "releasing" that portion of the active layer from handle wafer 316. To form mechanically active region 314, release holes 324 are etched through slab regions 330 to underlying BOX layer 318. A release etchant (e.g., hydrofluoric acid) is used to attack the BOX layer through release holes 324, thereby undercutting the active layer 320 and defining mechanically active region 314. This release etch is timed such that a portion of BOX layer 318 remains in place to define supports 322, which inhibit lateral propagation of acoustic energy between adjacent surface waveguides 304.

In some embodiments, mechanically active region 314 is supported above handle wafer 316 via a plurality of anchors, which are formed of structural material (e.g., polysilicon, silicon nitride, etc.) conformally deposited into vias formed through structural layer 320 and BOX layer 318 before the release etch is performed.

The inclusion of mechanically active region 314 mitigates coupling of acoustic energy 114 into the handle wafer, thereby enabling a highly efficient scatter process (as much as three orders of magnitude more efficient than prior-art systems). As a result, the amount of power required for device operation to effect light emission from the surface waveguides is reduced. It should be noted that a more efficient scatter process also reduces the required interaction length (i.e., the length over which mechanical waves 326 and light signals 112 interact). However, it is typically preferable for the interaction length to remain long to effect good far-field resolution and reduce power consumption. One skilled in the art will recognize, after reading this Specification, that forming mechanically active region 314 gives rise to a mechanical effect that is somewhat analogous to the total internal reflection of a light signal within a surface waveguide and reduces the mechanical damping of the mechanical energy by the substrate, each of which can increase the distance over which acoustic energy 114 can propagate on chip.

In the depicted example, the slab regions of the surface waveguides are mechanically connected along the entire length of the surface waveguides; however, in some embodiments, the slab regions are patterned to define discrete tethers that are distributed along the length of each surface waveguide such that that they extend between adjacent waveguides. As a result, the tethers support the surface waveguides above handle wafer 316 and also mitigate mechanical coupling between adjacent surface waveguides. In addition, mechanical and/or optical cross-talk between the surface waveguides can be inhibited by patterning the slab in more complex ways (e.g. to make subwavelength surface waveguides), as well as by varying waveguide core dimensions to inhibit coupling of optical and/or mechanical waves between distinct surface waveguides. Furthermore, surface waveguides 304 can be formed in any practical material system, including, without limitation, silicon on oxide (suspended or unsuspended), silicon nitride, diamond, silicon carbide, gallium nitride, gallium arsenide and its compounds, indium phosphide and its compounds, aluminum nitride, lithium niobate, lithium tantalite, and the like.

It is well understood that phased antenna arrays exhibit sidelobes whose size depends strongly on the spacing between their antennae elements. If the antennae are spaced by more than the wavelength of the light signals being operated on, the sidelobes become comparable to the main beam. Furthermore, not only do the sidelobes become large, the angular density of these lobes increases.

Because a low-confinement surface waveguide has a propagating optical mode that extends well into its cladding, adjacent low-confinement surface waveguides must be spaced apart by large distances to avoid cross-coupling of their optical modes. An acousto-optic antenna array based on low-confinement waveguides, therefore, would exhibit large sidelobes, reducing the optical power in the main output beam and the field of view of the system.

As noted above, however, embodiments in accordance with the present disclosure employ acousto-optic antenna arrays based on high-confinement waveguides. Since their optical modes do not extend significantly into their claddings, high-confinement waveguides can be spaced apart by much smaller distances—on the scale of the wavelength, of light signals 112. In fact, typically, surface waveguides 304 are arrayed with a pitch that is within the range of approximately $\lambda/3$ to approximately $2\lambda$. In embodiments, p1 is within the range of approximately 600 nm to approximately 2.5 microns. As a result, the scattering process is more efficient (by 3 orders of magnitude or more), thereby reducing the RF power required to effect beam steering, as well as the length of the surface waveguides required.

Furthermore, in contrast to acousto-optic deflection systems based on low-confinement waveguides, the length of surface waveguides 304 can be shorter—typically within the range of approximately 100 microns to approximately 1 cm. It should be noted that shorter length can be critical for integrated-optics-based optical waveguides due to the fact that it is difficult to maintain optical coherence over more than a few millimeters due to imperfections in the surface waveguides, which normally arise during fabrication. It also enables faster beam steering. In some embodiments, the effect of waveguide non-uniformity is mitigated by fabrication through ultraviolet (UV) lithography on large wafers.

In some embodiments, at least one of surface waveguides 304 is optically coupled with a photonic lightwave circuit that includes one or more photonic elements such as lasers, phase shifters, detectors, gain elements, modulators, diffraction elements, Bragg mirrors, splitters, combiners, and the like.

At operation 403, acoustic transducer 106 is formed on substrate 302 such that it is operatively coupled with acousto-optic antenna array 102.

In the depicted example, acoustic transducer 106 is an interdigitated transducer (IDT 306) that comprises piezoelectric slab 310 and interdigitated electrodes 312. Piezoelectric slab 310 is a layer of piezoelectric material (e.g., aluminum nitride, lithium niobate, lead zirconium titanate (PZT), indium phosphide, gallium arsenide and its compounds, etc.), which is formed on the top surface of active layer 320. In some embodiments, acoustic transducer 106 comprises a different mechanical transducer, such as a chirped IDT, electro-static actuation, electro-thermal actuation, thermal actuation, magneto-strictive actuation, optical excitation, etc. In some embodiments, acoustic transducer 106 includes a piezo-optic material, such as lithium niobate ($LiNbO_3$), and the like.

Electrodes 312 are interdigitated electrically conductive traces formed on the top surface of piezoelectric slab 310. When a periodic drive signal, such as a sinusoidally varying voltage, is applied to the interdigitated electrodes, IDT 306 generates acoustic energy 114 which propagates into surface waveguides 304 via mechanical phase shifters 308 as mechanical waves 326. Each of mechanical phase shifters 308 is located in the intervening portion of active layer 320 between acoustic transducer 106 and a different surface waveguides 304.

It should be noted that, in the depicted example, mechanical waves 326 and light signals 112 are counter propagating in the surface waveguides. In some embodiments, the mechanical waves and light signals propagate in the same direction in the surface waveguides.

At operation 404, phase controller 108 is formed on substrate 302.

Phase controller 108 comprises a plurality of mechanical phase shifters 308, each of which is formed on the top surface of active layer 320. Each mechanical phase shifters 308 is an element that is operative for changing the speed at which acoustic energy propagates between acoustic transducer 106 and a different one of surface waveguides 304 of acousto-optic antenna array 102. As a result, each mechanical phase shifter 308 is operative for controlling the phase of the acoustic wave received by the surface waveguide 304 with which it is operatively coupled.

In the depicted example, each of mechanical phase shifters 308 is a thermal element that tunes the elasticity of the region of active layer 320 between acoustic transducer 106 and its respective surface waveguide 304. In some embodiments, at least one of mechanical phase shifters 308 controls the density of the material of active layer 320 in at least a portion of the region between acoustic transducer 106 and each of surface waveguides 304. In some embodiments, beam steering in the y-z plane is effected by controlling the phase of light signals 112 using optical phase shifters.

Mechanical phase shifters 308 are collectively operative for controlling the phase relationship of the light scattered out of the surface waveguides, which dictates the transverse angle, $\phi$, of output beam 116 in the y-z plane.

Figure 5:
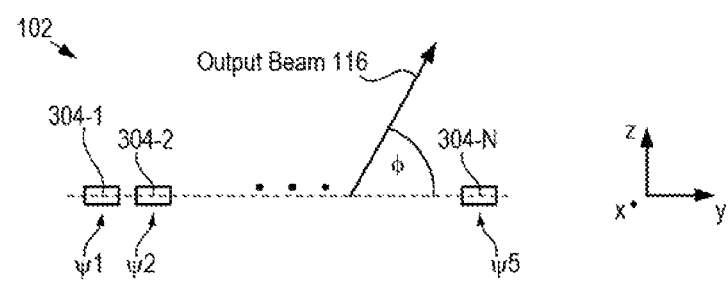
FIG. 5 depicts a schematic of a cross-section view of acousto-optic antenna array 102.

FIG. 5 depicts a schematic of a cross-section view of acousto-optic antenna array 102. The view depicted in FIG. 5 is taken through line b-b as shown in FIG. 3A. The phases, ψ1 through ψ5, of the mechanical waves 326-1 through 326-5 in surface waveguides 304-1 through 304-5, respectively, determine the angle, ϕ, in the y-z plane at which output beam 116 propagates.

Although the illustrative embodiment includes an acoustic transducer, a phase controller, and an acousto-optic antenna array that are monolithically integrated on the same substrate (i.e., formed on the same substrate), it will be clear to one skilled in the art, after reading this Specification, how to specify, make, and use alternative embodiments in accordance with the present disclosure in which at least one of acoustic transducer 106 and phase controller 108 is mechanically affixed to the substrate via hybrid-integration techniques such it is operatively coupled with acousto-optic antenna array 102. In some embodiments, at least one of acousto-optic antenna array 102, acoustic transducer 106, and phase controller 108 resides on a different substrate and is operatively coupled with the rest of system 100 via an intermediate medium.

At operation 405, light signals 112 are injected into surface waveguides 304 by optically coupling light source 104 and acousto-optic antenna array 102.

Figure 6:
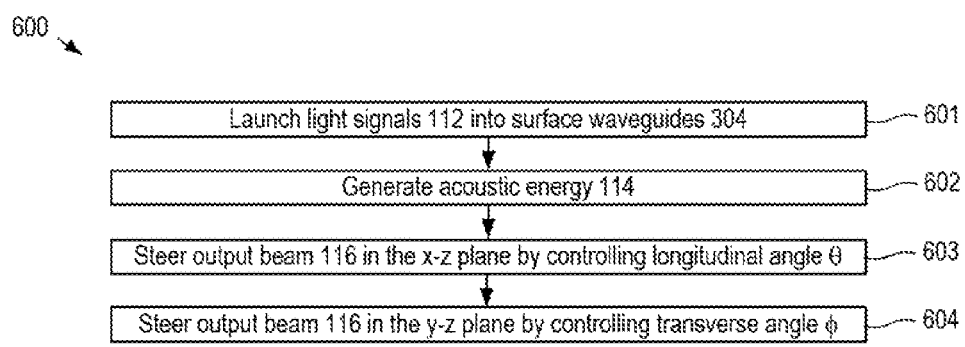
FIG. 6 depicts operations of a method for steering an optical beam in two dimensions in accordance with the illustrative embodiment.

FIG. 6 depicts operations of a method for steering an optical beam in two dimensions in accordance with the illustrative embodiment. Method 600 begins with operation 601, wherein light signals 112 are launched into surface waveguides 304 in response to a drive signal from processing circuit 110.

While not required, light source 104 is typically optically coupled with acousto-optic antenna array 102 such that light signals 112 are collectively in phase as they propagate through the surface waveguides of the antenna array when system 100 is in its quiescent state (i.e., when no mechanical energy is generated by acoustic transducer 106 and no phase change is proactively imparted on any of the light signals).

At operation 602, processing circuit 110 energizes acoustic transducer 106 to generate acoustic energy 114 that couples into each of surface waveguides 304 as a different one of mechanical waves 326, giving rise to free-space scatter energy that defines output beam 116.

At operation 603, processing circuit 110 directs phase controller 108 to steer output beam 116 in the x-z plane by controlling the frequencies of mechanical waves 326, which determines longitudinal angle θ.

At operation 604 processing circuit 110 directs phase controller 108 to control the relative phases, ψ1 through ψ5, of the mechanical waves 326-1 through 326-5 coupled with surface waveguides 304-1 through 304-5 to control transverse angle ϕ.

Figure 7:
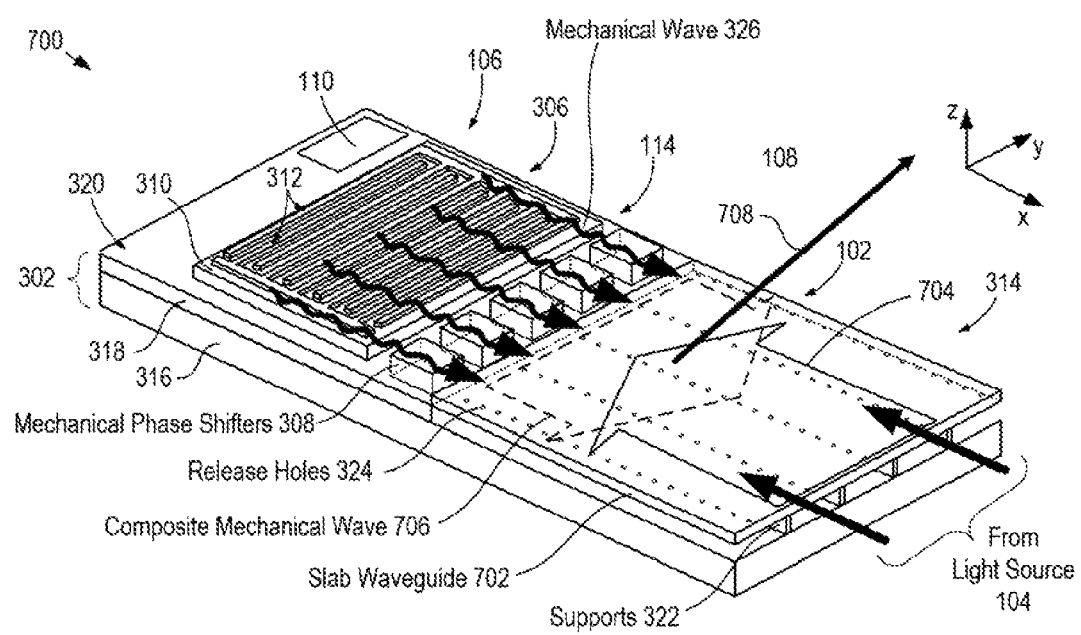
FIG. 7 depicts a beam-steering system in accordance with an alternative embodiment in accordance with the present disclosure.

FIG. 7 depicts a beam-steering system in accordance with an alternative embodiment in accordance with the present disclosure. System 700 is analogous to system 100 described above; however, system 700 includes a high-index-contrast slab waveguide instead of an array of individually defined channel-type surface waveguides.

Slab waveguide 702 is a high-confinement slab waveguide that strongly confines the light signal provided by light source 104 in the z-direction, thereby resulting in guided wave 704. In the depicted example, slab waveguide 702 is a layer of single-crystal silicon having a thickness of approximately 300 nm; however, other dimensions and/or materials can be used for slab waveguide 702 without departing from the scope of the present disclosure.

In operation, slab waveguide 702 receives light signal 704 from light source 104. Mechanical phase shifters 308 function as a "phased-array" that provides composite mechanical wave 706, which is steered within slab waveguide 702 by controlling the phase shifts imparted at the mechanical phase shifters.

When composite mechanical wave 706 and guided wave 704 interact, light from the guided wave is scattered into free space as output beam 708, whose transverse angle, ϕ, is based on the angle of incidence between the composite mechanical wave and the guided wave.

In some embodiments, system 700 includes a plurality of optical phase shifters that collectively control the direction of propagation of light signal 704 within slab waveguide 702. In such embodiments, the direction of propagation of output beam 708. In some of these embodiments, mechanical phase shifters 308 are not included and the direction of propagation of output beam 708 is controlled by controlling the direction of propagation of light signal 704 and the relative frequencies of mechanical wave 326 and light signal 704.

Figure 8:
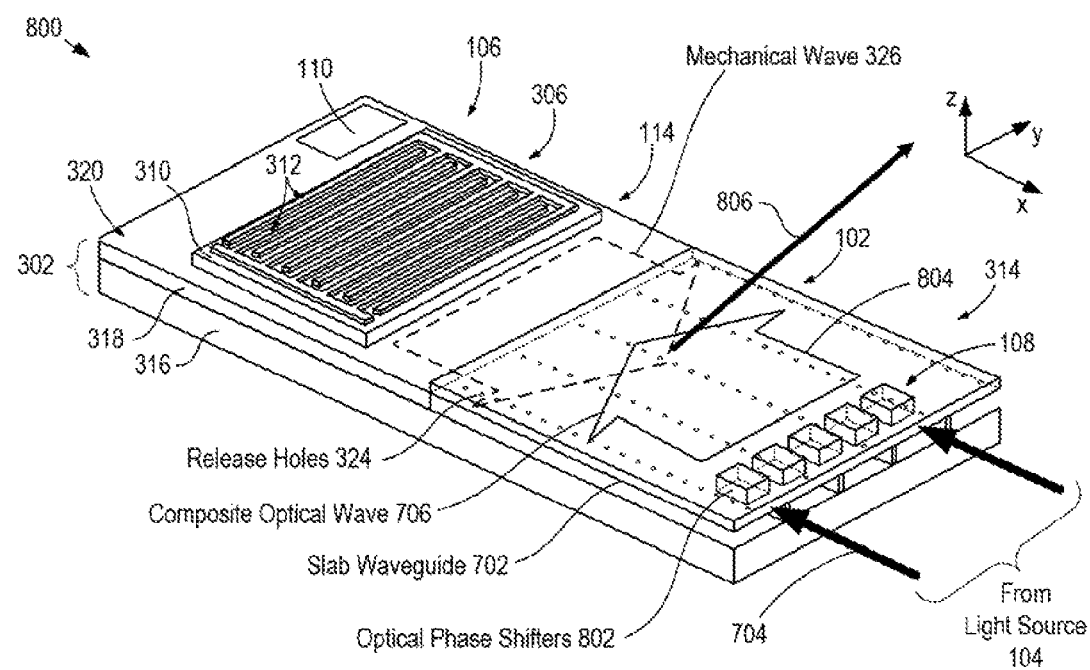
FIG. 8 depicts a beam-steering system in accordance with another alternative embodiment in accordance with the present disclosure.

FIG. 8 depicts a beam-steering system in accordance with another alternative embodiment in accordance with the present disclosure. System 800 is analogous to system 700 described above; however, system 800 includes a phase controller that includes a plurality of optical phase shifters configured to control the phases of a plurality of light portions of light signal 704 as the light portions propagate through slab waveguide 702.

Each of optical phase shifters 802 is a conventional integrated-optics-based phase shifter suitable for controlling the phase of a portion of light signal 704 as it propagates through the region of slab waveguide 702 with which it is operatively coupled. In the depicted example, each of phase shifters 802 is a thermal phase shifter. Other optical phase shifters suitable for use in embodiments in accordance with the present disclosure include stress-based phase shifters, surface acoustic wave-based (SAW-based) phase shifters, and the like.

The light portion that propagates into slab waveguide 702 from each of optical phase shifters 802 has a phase that is controlled by that phase shifter. Collectively, the plurality of light portions gives rise to composite optical signal 804 whose propagation direction within the slab waveguide is based on their relative phases.

In analogous fashion to the operation of system 700, the transverse angle of output beam 806 is based on the angle of incidence between mechanical wave 326 and composite guided wave 804, which is controlled by optical phase shifters 802.

In some embodiments, both optical phase shifters 802 and mechanical phase shifters 308 are included.

It is to be understood that the disclosure teaches just some examples of the illustrative embodiment and that many variations of the embodiments described herein can easily be devised by those skilled in the art after reading this disclosure and that the scope of the present invention is to be determined by the following claims.

What is claimed is:
1. An optical-beam steering system comprising:
   a substrate;
   a planar lightwave circuit (PLC) comprising at least one surface waveguide that is formed on the substrate such that the PLC and substrate are monolithically integrated, each of the at least one surface waveguide conveying at least a portion of a light signal, and the at least one surface waveguide defines a mechanically active region that is movable relative to the substrate;

an acoustic transducer that is configured to induce at least one mechanical wave in the at least one surface waveguide; and a phase controller comprising a plurality of phase shifters that includes a first phase shifter configured to control at least one of (1) the phase of a first mechanical wave of the at least one mechanical wave and (2) the phase of a first light portion of the light signal in a first surface waveguide of the at least one surface waveguide.

2. The optical-beam steering system of claim 1:
wherein the at least one surface waveguide includes a plurality of surface waveguides, each surface waveguide of the plurality thereof being movable relative to the substrate, and each surface waveguide of the plurality thereof conveying a different light portion of the light signal;
wherein the at least one mechanical wave includes a first plurality of mechanical waves, each of which is coupled into a different surface waveguide of the plurality thereof;
wherein each phase shifter of the plurality thereof is configured to control the relative phase of each mechanical wave of the first plurality thereof and the light portion conveyed by its respective surface waveguide.

3. The optical-beam steering system of claim 2 wherein the first phase shifter is operative for controlling a physical property of a first material region located between the acoustic transducer and the first surface waveguide.

4. The optical-beam steering system of claim 3 wherein the physical property is selected from the group consisting of elasticity and density.

5. The optical-beam steering system of claim 2 wherein each of the plurality of phase shifters is a mechanical phase shifter that is operative for controlling a different material region of a plurality thereof, wherein each material region is located between the acoustic transducer and a different surface waveguide of the plurality thereof.

6. The optical-beam steering system of claim 2 wherein each of the plurality of phase shifters is an optical phase shifter that is configured to impart a phase shift on a different portion of the light signal.

7. The optical-beam steering system of claim 2 wherein the light signal is characterized by a wavelength, and wherein each of the plurality of surface waveguides includes a first portion, and wherein the plurality of first portions is arranged in a linear array having a uniform pitch that is within the range of approximately $\lambda/3$ to approximately $2\lambda$.

8. The optical-beam steering system of claim 1 wherein the PLC defines a first plane, and wherein the plurality of surface waveguides and the acoustic transducer are configured such that at least one light portion of the plurality thereof and at least one mechanical wave of the first plurality thereof interact to scatter optical energy of the at least one light portion out of the first plane as at least one output beam.

9. The optical-beam steering system of claim 1 further comprising a plurality of supports that support the mechanically active region above the substrate, each support being located between a pair of adjacent surface waveguides of the plurality thereof, and each support being configured to mitigate mechanical coupling between its respective pair of adjacent surface waveguides.

10. The optical-beam steering system of claim 1 wherein the at least one surface waveguide includes a slab waveguide, and wherein the at least one mechanical wave includes a first plurality of mechanical waves that propagate in the slab waveguide, and further wherein the phase controller is configured to control the relative phases of the first plurality of mechanical waves.

11. The optical-beam steering system of claim 1 wherein the at least one surface waveguide includes a slab waveguide, and wherein the light signal includes a plurality of light portions, and further wherein the phase controller is configured to control the relative phases of the plurality of light portions.

12. A method for steering an optical beam, the method comprising:
conveying a light signal having wavelength $\lambda$ in at least one surface waveguide of a planar-lightwave circuit (PLC) that is formed on a substrate such that the at least one surface waveguide and the substrate are monolithically integrated, wherein the at least one surface waveguide defines a mechanically active region that is movable relative to the substrate;
coupling a plurality of mechanical waves into the at least one surface waveguide such that interaction between the plurality of mechanical waves and the at least one light signal gives rise to emission of an optical beam from the plurality of surface waveguides, wherein the mechanical waves are characterized by first frequency, $\omega$; and
controlling the first frequency, $\omega$.

13. The method of claim 12 wherein the at least one surface waveguide includes a plurality of surface waveguides that are movable relative to the substrate, and wherein the light signal includes a plurality of light portions, each of which propagates in a different surface waveguide of the plurality thereof, and further wherein a different mechanical wave of the plurality thereof is coupled into each of the surface waveguides of the plurality thereof.

14. The method of claim 13 further comprising controlling a first relative phase of a first light portion of the plurality thereof and a first mechanical wave of the plurality thereof in a first surface waveguide of the plurality thereof, wherein the first relative phase is at least partially controlled by controlling the phase of the first mechanical wave.

15. The method of claim 14 wherein the phase of the first mechanical wave is controlled by controlling a physical property of a first material region located between an acoustic transducer and the first waveguide, the physical property being selected from the group consisting of elasticity and density.

16. The method of claim 13 further comprising controlling a first relative phase of a first light portion of the plurality thereof and a first mechanical wave of the plurality thereof in a first surface waveguide of the plurality thereof, wherein the first relative phase is at least partially controlled by controlling the phase of the first light portion.

17. The method of claim 13 further comprising controlling the relative phases of the plurality of mechanical waves.

18. The method of claim 13 further comprising controlling the relative phases of the plurality of light portions.

19. The method of claim 13 wherein each of the plurality of surface waveguides includes a first portion, and wherein the plurality of first portions is arranged in a linear array having a uniform pitch that is within the range of approximately $\lambda/3$ to approximately $2\lambda$.

20. The method of claim 12 wherein the PLC defines a first plane, and wherein the method further includes: interacting at least one light portion of the plurality thereof and at least one mechanical wave of the first plurality thereof to scatter optical energy of the at least one light portion out of the first plane to define the optical beam.

21. The method of claim 12 wherein the at least one surface waveguide includes a slab waveguide, and wherein the plurality of mechanical waves is coupled into the slab waveguide.

22. The method of claim 21 wherein the at least one surface waveguide includes a slab waveguide, and wherein the plurality of mechanical waves is coupled into the slab waveguide as a composite wave.

23. The method of claim 22 further comprising controlling the phases of the plurality of mechanical waves, wherein the propagation direction of the composite wave in the slab waveguide is based on the phases of the plurality of mechanical waves.

24. The method of claim 22 further comprising controlling the phases of a plurality of light portions included in the light signal, wherein the propagation direction of the light signal in the slab waveguide is based on the phases of the plurality of light portions.

* * * * *